Aug. 11, 1953  F. H. KAYLER  2,648,544
RESILIENTLY MOUNTED FIFTH WHEEL MEMBER
Filed Feb. 12, 1949  2 Sheets-Sheet 1
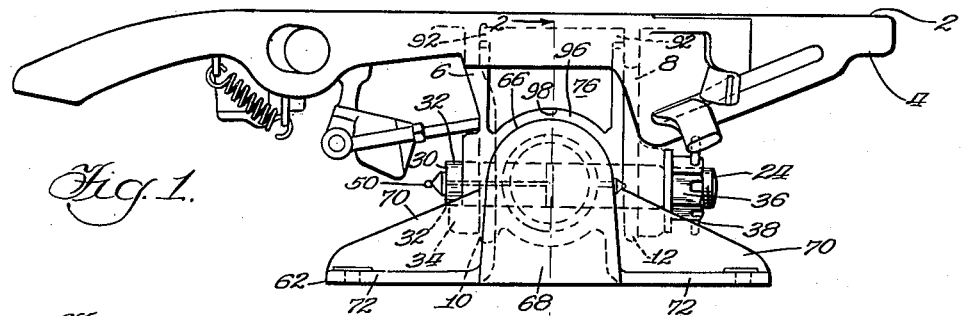
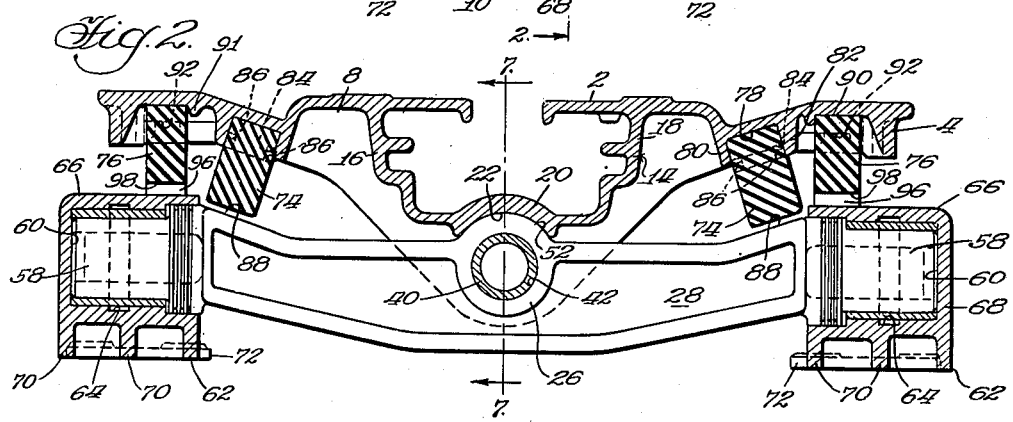
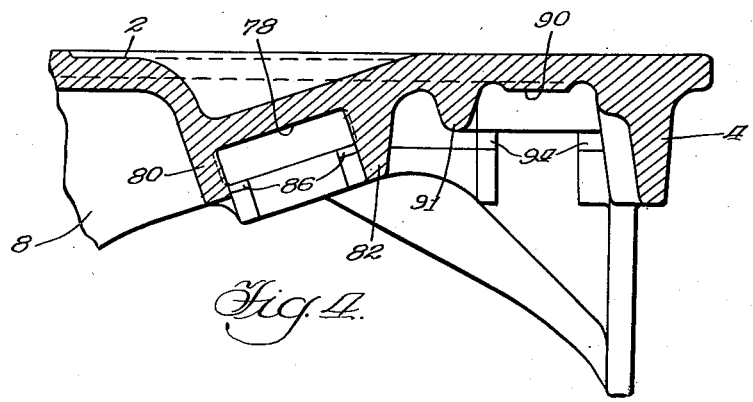
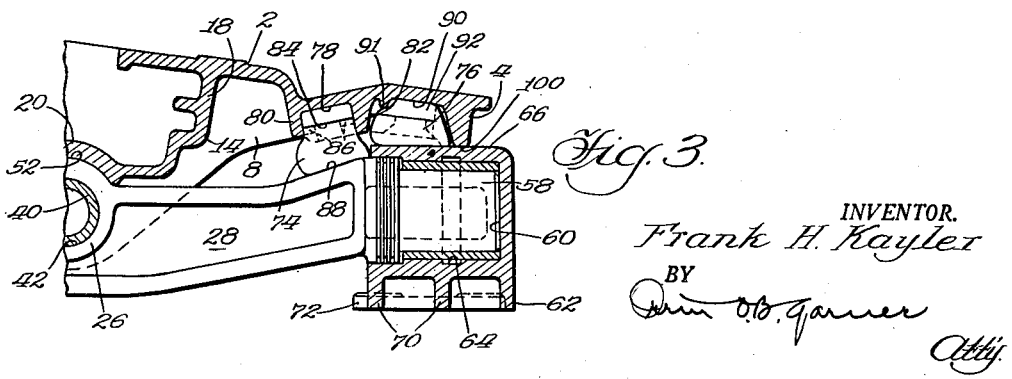
INVENTOR.
Frank H. Kayler Aug. 11, 1953 F. H. KAYLER 2,648,544
RESILIENTLY MOUNTED FIFTH WHEEL MEMBER
Filed Feb. 12, 1949 2 Sheets-Sheet 2

INVENTOR.
Frank H. Kayler
BY
Atty.

Patented Aug. 11, 1953

2,648,544

UNITED STATES PATENT OFFICE 2,648,544

RESILIENTLY MOUNTED FIFTH WHEEL MEMBER

Frank H. Kayler, Alliance, Ohio, assignor to American Steel Foundries, Chicago, Ill., a corporation of New Jersey Application February 12, 1949, Serial No. 75,990

16 Claims. (Cl. 280—33.05)

This invention relates to tractor-trailer coupling means and more particularly to a novel fifth wheel mechanism commonly known as the side oscillating type and comprising a plate or platform member pivoted to a support.

A general object of the invention is to provide an improved coupler wherein side oscillations of the plate member are stabilized by yieldable means arranged to absorb twisting strains between the tractor, the trailer, and the coupler to protect the same from shock damage and prevent free rocking and excessive trailer roll.

The invention contemplates the provision of a plurality of resilient units or cushions on the plate at each side thereof, the units at each side being arranged to engage the support in series during lateral oscillations of the plate to afford a light spring action for controlling minor lateral oscillations of the plate and heavy spring action for resisting major oscillations. The cushions are spaced from the support when the plate is in normal horizontal position whereby slight lateral tilting of the plate is accommodated without stressing the parts or the cushions and thus considerably prolonging the life of the cushions.

A further object of the invention is to arrange and secure the cushions on the plane at points where they will be most effective and yet accessible and readily removable for replacement without dismantling the fifth wheel assembly.

A different object of the invention is to arrange the cushions so that they will engage the strongest parts of the support.

A still further object of the invention is to provide stop means on the plate engageable with the support to prevent over-compression and permanent distortion of the cushions.

An additional object of the invention is to provide an improved slack-free connection between the plate and the support to insure proper functioning of the resilient units.

These and other objects of the invention will be apparent from the specification and the drawings, wherein:

Figure 1 is a side elevational view of a fifth wheel assembly embodying the invention;

Figure 2 is a sectional view taken substantially on the line 2—2 of Figure 1, with the beam shown in side elevation;

Figure 3 is a fragmentary view comparable to Figure 2 and showing the plate in extreme laterally tilted position, with the block illustrated in end elevation;

Figure 4 is a fragmentary view similar to Figure 2 and illustrating the construction of the plate member;

Figure 5:
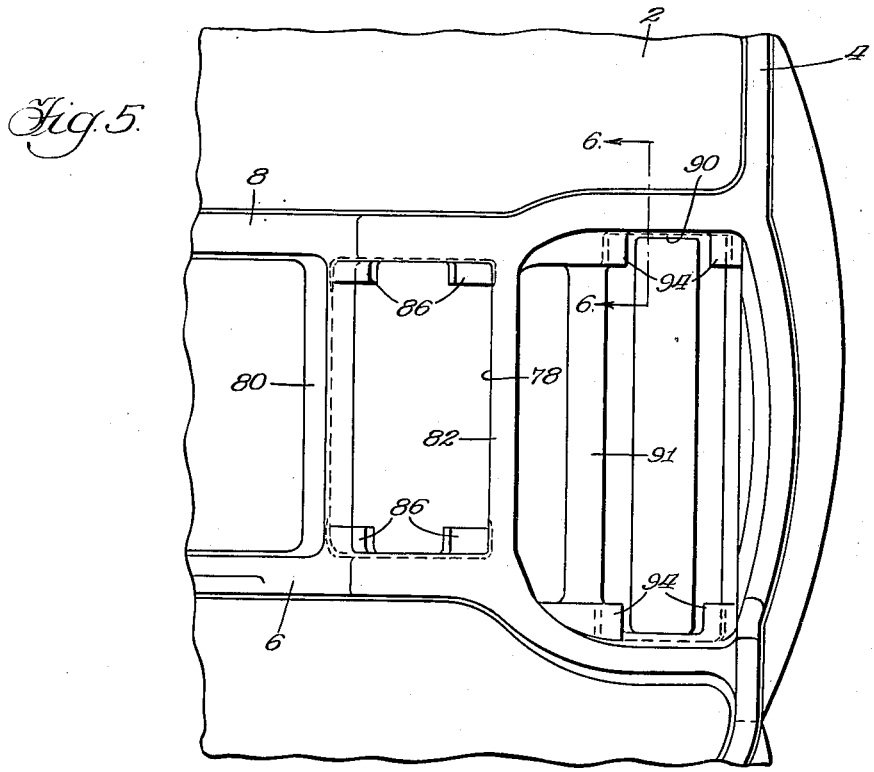
Figure 5 is a bottom view of the portion of the plate member shown in Figure 4.

Describing the invention in detail, the coupler includes a fifth wheel member or top plate 2 of conventional form, having a peripheral strengthening flange 4. The plate 2 is provided with a pair of spaced depending transverse webs 6 and 8 adjacent the center portion thereof, the webs terminating at their lower ends in lugs 10 and 12 (Figure 7), respectively, adjacent the center of the plate. The lateral ends of the webs 6 and 8 are made integral with flange 4 and, intermediate their ends adjacent the center of the plate above the lugs 10 and 12, are joined by a housing 14 (Figures 2 and 3) adapted to contain a locking mechanism (not shown). The locking mechanism forms no part of the present invention and may be of the type shown and described in Patent No. 2,015,313, issued by the United States Patent Office on May 14, 1932, to Edmund P. Kinne.

The housing comprises spaced side portions 16 and 18 which are formed integral with webs 6 and 8 and the underside of the plate 2 and the side portions are connected by an intermediate web 20 which is provided with a downwardly facing bearing surface 22 curved transversely of the fifth wheel.

The fifth wheel is supported to oscillate sidewise on a substantially horizontal axis extending longitudinally of the fifth wheel on a pin or bolt 24 which extends through complementary openings in the lugs 10 and 12 and through a bearing portion 26 provided at the center of a beam 28, said beam extending transversely of the plate.

The bolt 24 comprises a head 30 at one end with flattened sides 32, 32, one of the sides seating against a ledge 34 extending outwardly from the external side of lug 10 to prevent the bolt from turning. The other end of the bolt has a threaded portion on which is mounted a castle nut 36 engaging the external side of lug 12. The nut 36 may be locked to the bolt by a cotter key 38.

The bearing 26 is provided with spaced bushings 40, 40 (Figure 7) press-fitted into an opening 42 therein. The bushings are sleeved on bolt 24 and define a lubricant cavity 44 (Figure 7) therebetween around the bolt and communicating with a transverse branch 46 of a lubricant passage 48 extending longitudinally of the pin through the head thereof. The end of the passage at the head of the bolt may be provided with a conventional grease fitting 50 The provision of the lubricant passage and cavity assures proper lubrication of the pin and the bushings to reduce wear.

Figure 7:
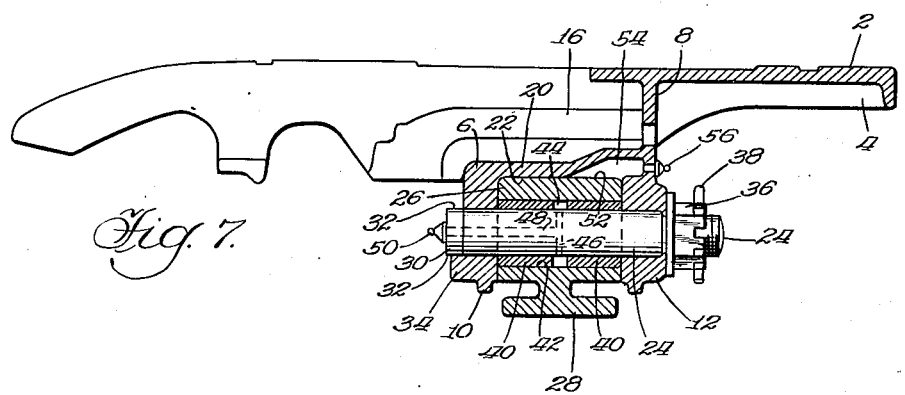
Figure 7 is a longitudinal vertical sectional view of the assembly taken substantially on the line 7—7 of Figure 2.
Figure 6:
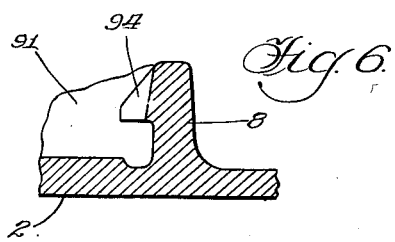
Figure 6 is a fragmentary sectional view taken on the line 6—6 of Figure 5.

It will be noted from a consideration of Figure 7 that the bearing surface 22 is fitted over a complementary surface 52 on the top of the bearing 26 and that the web 20 is offset upwardly adjacent web 8 to form a grease cavity 54 interrupting surface 22 and open to the surface 52 of the bearing 26. Web 8 may be provided with a grease fitting 56 communicating with cavity 54.

The beam 28 is preferably H-shaped in cross section, as best seen in Figure 7, and is provided at each end with a bushed cylindrical trunnion 58, extending into a complementary socket 60 in a bracket 62 designed to afford a support for the fifth wheel assembly from an associated tractor frame (not shown). It will be noted that the beam accommodates longitudinal tilting or oscillation of the fifth wheel member on a horizontal axis extending transversely of the plate 2 and together with brackets 62 constitutes a support for the plate 2.

Each socket 60 may be disposed centrally of the related bracket and may be provided with a grease fitting communicating with a slot 64 (Figures 2 and 3) within the socket and open to the bushing on the trunnion fitted within the socket. It will be understood that the bushings may be press fitted into the sockets and provided with openings communicating with the slot 64 and the trunnion which may turn within the bushing. Each socket 60 may comprise a tubular portion 66 surrounding the adjacent end of the related trunnion, the portion 66 being closed by a substantially vertical web 68 at its outer end and at opposite sides merging with spaced vertical ribs or webs 70, 70 which are made integral with flat mounting webs 72, 72 of the associated bracket.

Side or lateral oscillations of the plate are yieldingly restrained by resilient units or blocks 74 and 76 at each side of the plate, which are secured to the plate, as hereinafter more fully described, and spaced from the beam and the bracket in order to accommodate normal slight lateral oscillation of the plate without stressing the resilient units, whereby the life of each unit is considerably prolonged and unnecessary stressing of the parts of the fifth wheel assembly is avoided.

Each unit 74 comprises a block of resilient material received at its upper end within a pocket 78 formed on the underside of the plate 2, the pocket being defined by the spaced webs 6 and 8 and intervening ribs 80 and 82 depending from the plate 2 and interconnecting the webs 6 and 8. The upper end of each block 74 is provided with laterally extending tongues 84 received between the underside of the plate member 2 and the top sides of lugs 86 formed at the corners of the pocket 78. It will be noted that the blocks 74, 74 at opposite sides of the plate are disposed angularly with respect to each other and lie in upwardly converging planes and that the portions of the plate affording seats for the upper ends of blocks 74 are depressed below the normal top surface of the plate 2 and diverge upwardly laterally of the plate. Each block 74 has its lower end arranged to engage a diagonal surface 88 at the adjacent end of the beam, each surface 88 sloping upwardly laterally of the coupler structure substantially normal to the compressional axis of the associated block 74.

The blocks 76, which may be of rubber material, are spaced outwardly with respect to the inner blocks 74 and each block 76 is received at its upper end within a pocket 90 in the underside of the plate, each pocket 90 being defined by the spaced webs 6 and 8 and by the flange 4 and a rib 91. Each block 76 is secured within the associated pocket 90 by laterally extending tongues 92 on the block tightly fitted between the undersurface of the plate 2 and lugs 94, 94 formed at the corners of the associated pocket 92. The blocks 76 are disposed above the respective brackets 62, 62 and extend substantially vertically, and each block 76 is cut out at its lower end to provide a cavity 96 which is complemental to the top surface of the portion 66 of the adjacent socket. The lower end of each block 76 is provided with an arcuate surface 98 which is designed to have complemental engagement with the top surface of the associated socket portion 66. It will be noted that the surfaces 96 and 66 are concentric whereby substantially full face engagement between these surfaces is had during lateral oscillation of the plate member even when the plate member is tilted forwardly or rearwardly from the horizontal.

Referring now to Figure 3, it will be seen that by spacing the units 74 and 76, ample room is provided around each unit to accommodate flow of the material constituting the units and it will be realized that under minor lateral oscillations of the plate, the units 74 are alternately compressed between the plate and the surfaces 88, 88 on the beam 28, and that when the plate 2 tilts laterally a sufficient distance, the unit 76 on the side toward which the plate is tilted is caused to engage the associated socket portion and to be compressed with the associated unit 74. To accommodate enough bulging space for the unit 76, the pockets 90 are made purposely sufficiently large. To prevent overcompression of the units 74 and 76, flange 4 provides abutment means which are engageable as at 100 (Figure 3) with the associated socket portion 66 under maximum lateral tilting of the plate member 2. The units 74 and 76 are distortable and are compressible transversely to disengage the lugs therein with the lugs in the pockets, whereby the units are readily insertable or removable from the respective pockets.

I claim:

1. In a coupling device, a plate member having spaced transverse webs, a wall between said webs presenting a bearing face curved transversely of said member, a beam extending transversely of said member between said webs and having a surface adapted for complementary engagement with said bearing face, a pivot element extending through said webs and beam, said wall being offset upwardly away from said surface on said beam to provide a lubricant cavity open to said surface, bushings interposed between said element and said beam and spaced axially of the former and defining a lubricant cavity therebetween, and a lubricant passageway extending through said element from one end thereof to said last-named cavity.

2. In a fifth wheel assembly, a plate member, spaced supports, a beam extending transversely of said plate member journaled to said supports, a pivotal connection between said plate member and said beam accommodating lateral oscillation of said member, diagonal surfaces on said beam adjacent opposite ends thereof, resilient elements connected to said member adjacent respective surfaces and engageable with said surfaces during lateral oscillation of said plate member for yieldingly controlling the same, a resilient member above each support connected to said plate member and engageable with the adjacent support after predetermined compression of the adjacent resilient element.

3. In a tractor-trailer coupling device, a fifth wheel member, a support, a connection therebetween accommodating lateral oscillation of said member, resilient units spaced laterally of said member, a tongue and groove interlock between each unit and said member, the compressional axes of certain of said units being arranged angularly with respect to the compressional axes of the other of said units, and surfaces on said support arranged substantially normal to the compressional axes of respective units and engageable therewith during lateral oscillation of said member for compression between said member and said support for yieldingly resisting lateral oscillation of said member.

4. In a tractor-trailer coupling device, a fifth wheel assembly including a plate, a support at each side of said assembly, a beam extending between said supports and journaled thereto, a pivotal connection between said plate and said beam intermediate the ends of the latter and accommodating lateral oscillation of said plate, and resilient means carried by said plate at opposite sides of the axis of pivot thereof, certain of said resilient means being engageable with said beam and other of said resilient means being engageable with respective supports and being compressible to resist lateral oscillations of said plate.

5. In a tractor-trailer coupling device, a fifth wheel member, a support, a connection therebetween accommodating lateral oscillation of said member, spring means carried by said member at each side thereof, reversely arranged vertically converging surfaces on said support disposed at opposite sides of said member and extending substantially normal to the compressional axes of respective spring means, said spring means being spaced from and arranged to engage respective surfaces for compression between said member and said surfaces to yieldingly resist lateral oscillations of said member.

6. In a device of the class described, a plate member, a support, a connection therebetween accommodating lateral oscillation of said plate member, and resilient means carried solely by said plate member at opposite sides thereof engageable with said support for compression between said member and said support for yieldingly resisting lateral oscillations of said member, the means on each side of said member comprising spaced units, one of said units being spaced closer to said support than the other of said units.

7. In a device for coupling tractor-trailer combinations, a fifth wheel member, a support, a connection therebetween accommodating lateral angling of said member, and resilient blocks interposed between said member and support for compression therebetween for yieldingly resisting said angling of said member, and interengaging means on said blocks and member comprising lugs on said blocks interposed between said member and lugs on said member.

8. In a device for coupling tractor-trailer combinations, a plate member, a support, a pivotal connection between said member and said support accommodating relative lateral angling therebetween, and resilient means interposed between said member and support at opposite sides of the axis of pivot thereof for compression therebetween during lateral angling thereof, each of said independent resilient means comprising a plurality of resilient elements spaced radially with respect to the axis of pivot of said member and formed and arranged for successive compression between said support and said member during angling therebetween.

9. In a tractor-trailer coupling device, a fifth wheel member, a support, a connection therebetween accommodating lateral oscillation of said member, and means for yieldingly resisting lateral oscillation of said member, said means comprising a plurality of resilient units mounted solely on said member at each side thereof and normally spaced different distances from said support and successively engageable with said support for compression between said member and said support during lateral oscillation of the former.

10. In a device for coupling vehicles, a fifth wheel, a support, a universal connection therebetween accommodating longitudinal and lateral oscillation of said member, and means for yieldably controlling lateral oscillations of said wheel comprising a plurality of resilient units spaced different distances from said support and mounted solely on each side of said wheel and successively engageable with said support for compression between said wheel and support during lateral oscillation of said wheel.

11. In a device for coupling vehicles, a fifth wheel member, a support, a universal connection therebetween accommodating longitudinal and lateral oscillation of said member, and means for yieldingly resisting lateral oscillations of said member comprising spaced resilient units at each side of said member spaced different distances from the support to successively engage said support for compression between said member and support to progressively increase the resistance to oscillations between said members as said oscillations increase.

12. In a tractor-trailer coupling device, a plate member, a support member, a connection between said members accommodating lateral oscillation of said plate member, and a plurality of resilient units carried solely by one of said members along each side thereof and normally spaced different distances from the other of said members and engageable with the latter successively during lateral oscillation of said plate member for compression between said members.

13. In a vehicle coupling device, a plate member, a support member, a pivotal connection therebetween, and means for yieldingly resisting pivotal movement between said members beyond certain limits comprising a plurality of resilient means carried on each side of one of said members for successive engagement with the other member only after said limits are exceeded for compression between said members, the resilient means being carried solely by one of said members and comprising spaced units on each side thereof spaced different distances from the other of said members.

14. In a vehicle coupling device, a top plate member and bottom support member pivoted together, and means for yieldingly resisting pivotal movement of said members beyond certain limits comprising resilient means interposed between said members and fixed to only one thereof and spaced different distances from the other thereof and engageable with the other thereof when said members pivot beyond certain limits, said resilient means comprising a plurality of independent spring elements at each side of the axis of pivot of said members and spaced different distances from said axis and arranged to be successively compressed between said members at different angles of pivot between said members.

15. In a fifth wheel assembly, a pivoted top plate member, and means for yieldingly resisting pivotal movement of said member beyond certain limits, comprising a plurality of resilient means carried solely by said plate and arranged to be successively compressed by said member only when it pivots beyond said limits, said member being accommodated for substantial predetermined pivotal movement without restraint by said resilient means.

16. In a fifth wheel assembly, a support, a plate, a universal connection therebetween accommodating pivoting of said plate on axes extending transversely and longitudinally of said assembly, and resilient means carried solely by the plate at opposite sides of the longitudinal axis and comprising a plurality of elements normally spaced different distances from the support for successive compression between the support and plate when the plate pivots on said longitudinal axis beyond prescribed limits, said support and said elements having engaging surfaces substantially concentric with said transverse axis whereby said surfaces are engageable along substantially the full areas thereof when said plate angles on said transverse axis.

FRANK H. KAYLER.

References Cited in the file of this patent

UNITED STATES PATENTS

| Number | Name | Date |
|---|---|---|
| 1,380,490 | Masury | June 7, 1921 |
| 1,990,731 | Greer | Feb. 12, 1935 |
| 2,306,459 | Mennen | Dec. 29, 1942 |
| 2,336,939 | Kinne | Dec. 14, 1943 |
| 2,468,013 | Kayler | Apr. 19, 1949 |